United States Patent
Bobay

[11] Patent Number: 5,831,358
[45] Date of Patent: Nov. 3, 1998

[54] ROTOR END CAP

[75] Inventor: Dennis P. Bobay, Ossian, Ind.

[73] Assignee: General Electric Company, Fort Wayne, Ind.

[21] Appl. No.: 940,170

[22] Filed: Sep. 30, 1997

[51] Int. Cl.[6] .................................................. H02K 9/00
[52] U.S. Cl. ............................... 310/58; 310/51; 310/60; 310/61; 310/62; 310/68 B; 310/261
[58] Field of Search .................................. 310/51, 60, 61, 310/68 B, 261, 191

[56] References Cited

U.S. PATENT DOCUMENTS

| | | | |
|---|---|---|---|
| 3,906,266 | 9/1975 | Cowman | 310/60 R |
| 4,082,968 | 4/1978 | Jones | 310/68 B |
| 4,115,030 | 9/1978 | Inagaki et al. | 416/93 R |
| 4,184,804 | 1/1980 | Inagaki et al. | 415/213 R |
| 4,553,055 | 11/1985 | Auernhammer | 310/62 |
| 4,862,025 | 8/1989 | Dierker, Jr. et al. | 310/68 B |
| 5,070,268 | 12/1991 | Phelon et al. | 310/153 |
| 5,144,175 | 9/1992 | Craggs | 310/63 |
| 5,272,402 | 12/1993 | Blaser et al. | 310/68 B |
| 5,375,637 | 12/1994 | Matsumoto et al. | 144/136 |

*Primary Examiner*—Steven L. Stephan
*Assistant Examiner*—Thanh Lam
*Attorney, Agent, or Firm*—Wayne O. Traynham

[57] ABSTRACT

A rotor end cap for use with a rotor of a dynamoelectric machine to induce cooling air circulation, facilitate rotor balancing and enable rotor rotational position and speed sensing. The rotor end cap includes a base for attachment to a rotor of the dynamoelectric machine so that the base turns with the rotor. Further, the end cap includes a plurality of blades extending from the base in axial and radial directions with respect to the rotor for moving air to enhance cooling air circulation within the machine as the rotor turns. Still further, the end cap includes a balancing device extending from the base for altering a weight distribution around the base to balance the rotor. Yet still further, the end cap includes at least one shutter extending partially around the base for intermittently blocking passage of light as the rotor turns to enable rotational position and speed sensing of the rotor.

18 Claims, 3 Drawing Sheets

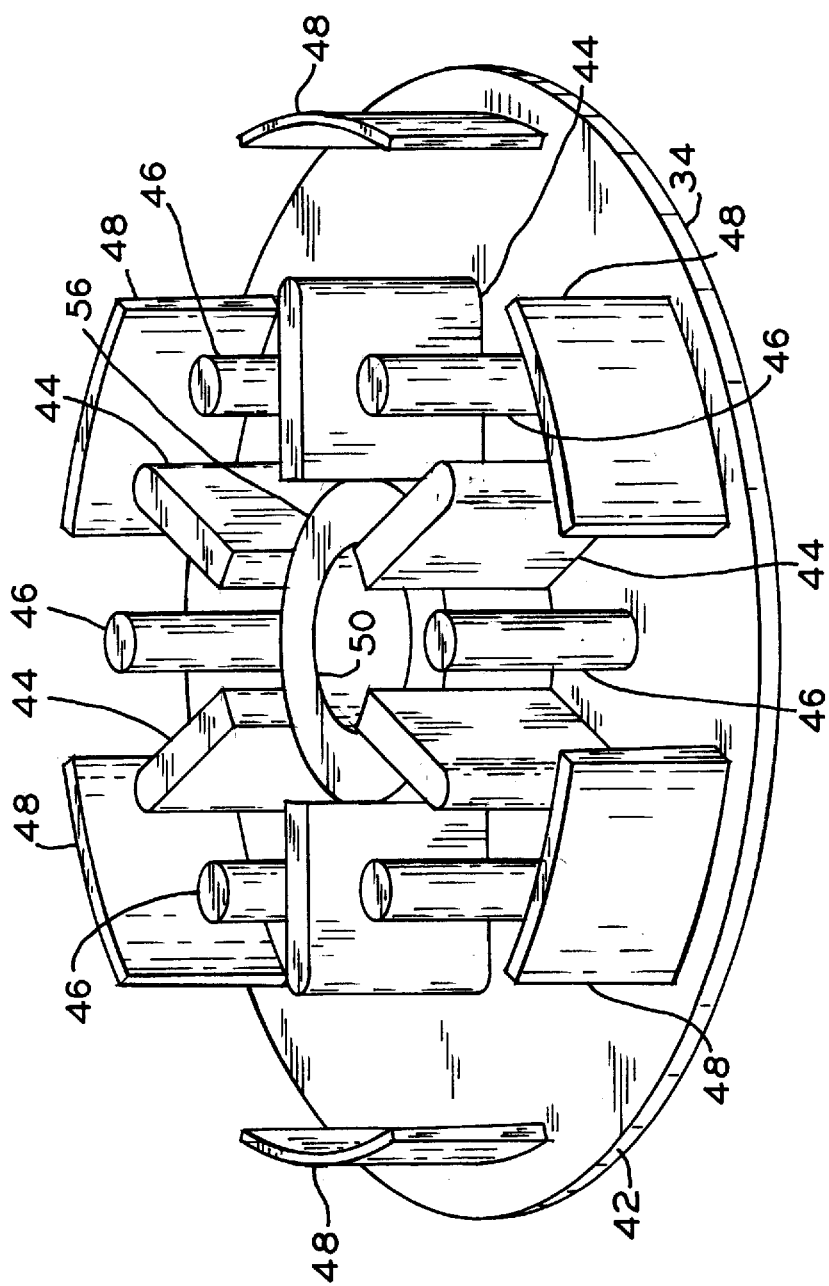

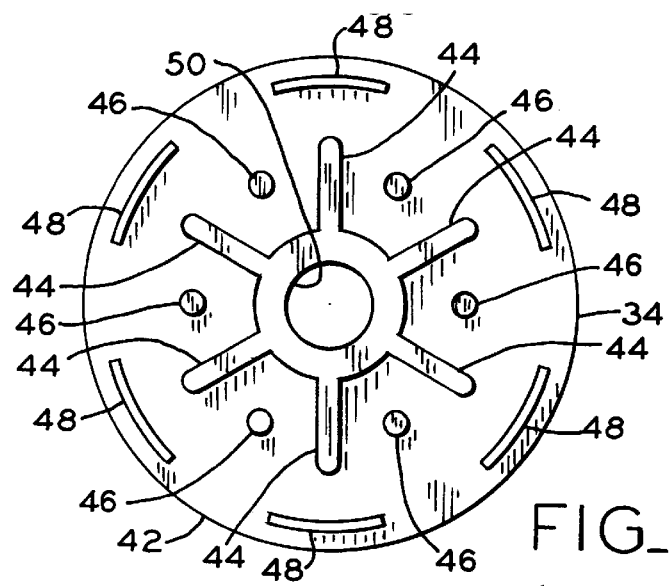
FIG_3
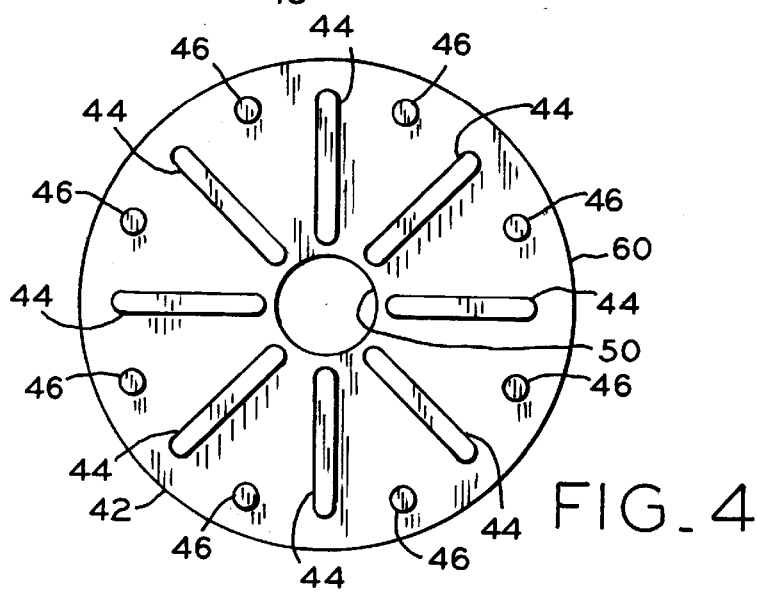
FIG_4
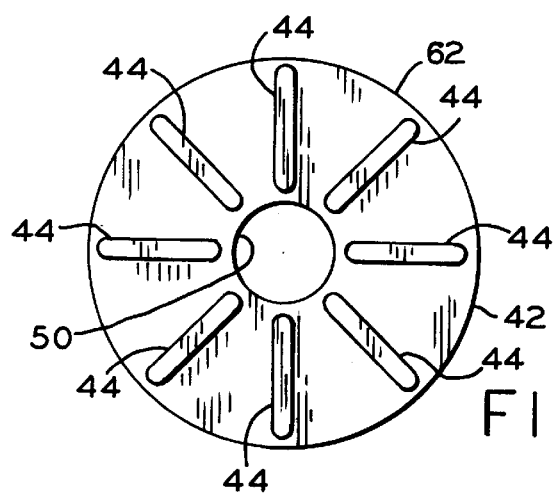
FIG_5

ROTOR END CAP

BACKGROUND OF THE INVENTION

This invention relates generally to end caps for use with rotors of dynamoelectric machines, and in particular to an end cap for inducing cooling air circulation, facilitating rotor balancing and enabling rotor position and speed sensing.

Dynamoelectric machines such as electric motors generate heat during operation which may be detrimental to the machines. Further, component parts such as windings and control boards within motors may be damaged or degraded by high temperatures. Consequently, electric motors are typically cooled by air moving through and around the motors which transports heat energy away from hot parts. Air circulation enhancements improve cooling efficiency.

Rotor weight imbalance may also be detrimental to both motor operation and component parts. A rotor spins within an electric motor during operation. If the weight distribution of the rotor is not balanced, vibration results. Vibration causes noise and produces vibratory stresses within various motor components. These stresses degrade operating performance of the motor and reduce its life. Thus, rotor balance is important to reduce noise and cyclic stresses in the motor and to improve the motor life. Previous methods of balancing rotors have relied on adding weights, similar to the method used in automobile tire balancing. In order to achieve balance, small weights have been added to the rotor. However, these weights can detach from the rotor thereby limiting their effectiveness.

Measurement of angular position and rotational speed of rotors is crucial for proper motor operation because it is desirable to trigger certain events when the rotor is at various angular positions and speeds. For instance, a design may require that power only be supplied to the windings when the rotor is at a certain position relative to a stationary assembly within the motor. Further, the rotational speed of the rotor must be known in order to provide adequate control. Many previous devices for sensing rotor position and speed have relied on rotating magnets with sensors that detect the resulting magnetic flux variations during rotation. However, magnetic speed sensors are complex.

SUMMARY OF THE INVENTION

Briefly, apparatus of the invention provides a rotor end cap for use with a rotor of a dynamoelectric machine to induce cooling air circulation, facilitate rotor balancing and enable rotor position and speed sensing. The end cap comprises a base for attachment to the rotor of the dynamoelectric machine so that the base turns with the rotor. The end cap further comprises a plurality of blades extending from the base in axial and radial directions with respect to the rotor for moving air to enhance cooling air circulation within the machine as the rotor turns. Still further, the end cap comprises balancing means extending axially from the base for altering a weight distribution around the base to balance the rotor. In addition, the end cap comprises at least one shutter extending partially around the base for intermittently blocking passage of light as the rotor turns to enable rotational position and speed sensing of the rotor.

In another aspect, apparatus of the invention provides a dynamoelectric machine comprising a casing having a hollow interior, a stationary assembly within the hollow interior of the casing, a rotor rotatably received within the hollow interior of the casing, and an end cap. The end cap includes a base for attachment to the rotor, a plurality of blades extending from the base in axial and radial directions for moving air, balancing means extending from the base for altering a weight distribution around the base, and at least one shutter extending partially around the base for intermittently blocking passage of light as the rotor turns.

Other objects and features of the invention will be in part apparent and in part pointed out hereinafter.

BRIEF DESCRIPTION OF THE DRAWINGS

FIG. 2 is a perspective view of a rotor end cap of the present invention;

FIG. 3 is an end elevation of the rotor end cap;

FIG. 4 is an end elevation of a second embodiment of the rotor end cap; and

FIG. 5 is an end elevation of a third embodiment of the rotor end cap.

Corresponding reference characters indicate corresponding parts throughout the several views of the drawings.

DETAILED DESCRIPTION OF THE PREFERRED EMBODIMENT

Figure 1:
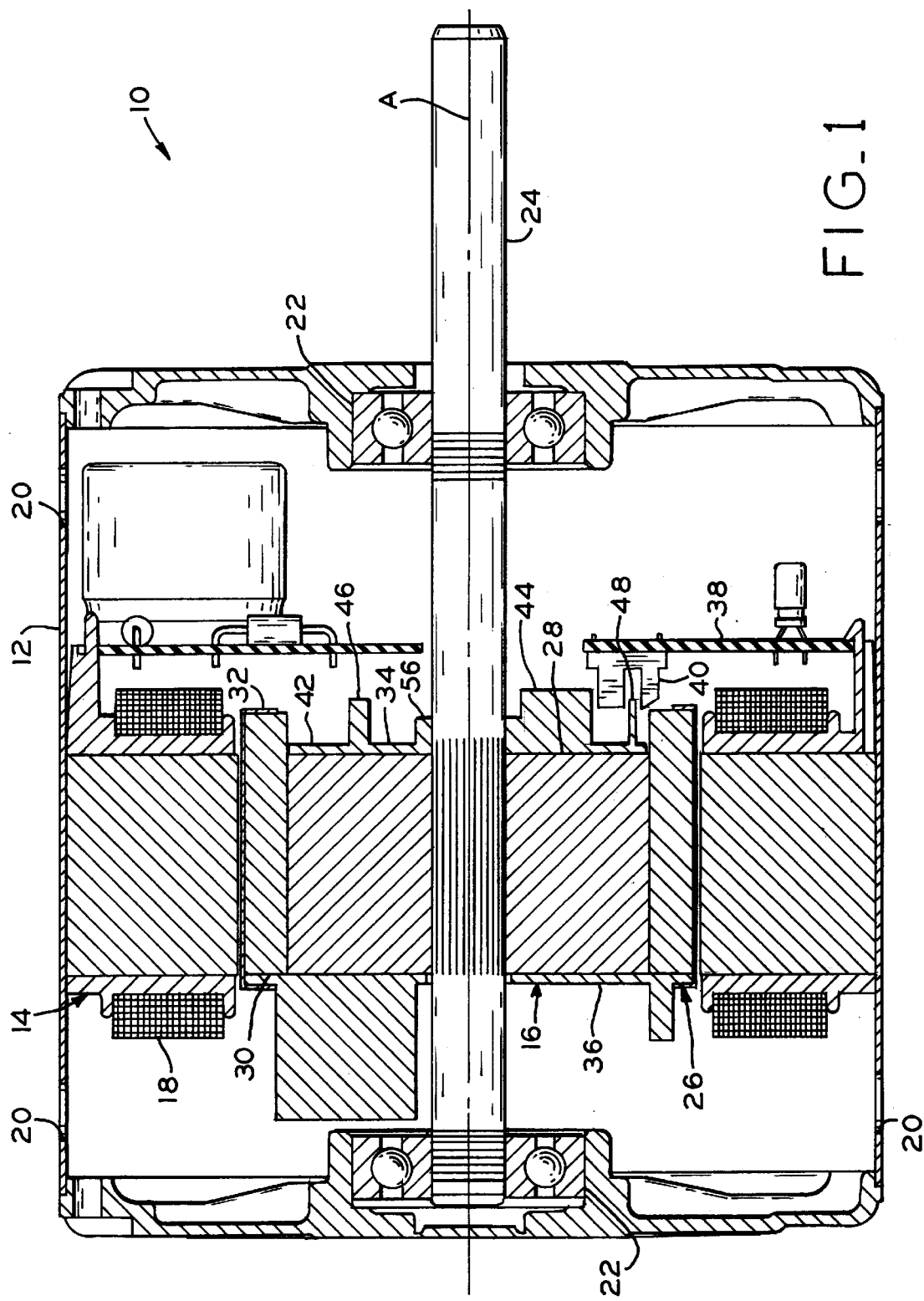
FIG. 1 is a schematic cross section of an electric motor having a rotor end cap of the present invention.

Referring now to the drawings and in particular to FIG. 1, an electric motor is designated in its entirety by the reference numeral 10. The motor 10 includes a casing 12 having a hollow interior. A stationary assembly or stator (generally designated 14) and a rotatable assembly or rotor (generally designated 16) magnetically coupled to the stator are both positioned within the interior of the motor casing 12. As is known in the art, the stator 14 is generally annular and holds one or more wire-wound coils, or windings, 18. When energized with electrical current, the windings 18 interact with the rotor 16 to produce torque.

Vent openings 20 in the casing 12 permit air to circulate through the motor 10 to cool its component parts. Bearings 22 mounted on each end of the motor casing 12 receive the rotor 16, so the rotor is free to rotate about a central axis A which is coaxial with the stator 14.

The rotor 16 includes an elongate shaft 24 which extends through the casing 12 for transmitting power to a device attached to the shaft. (The driven device is not shown in the drawings.) A magnetic rotor core, generally designated 26, is attached to the shaft 24 so it rotates inside the stator 14 as the rotor 16 turns on the shaft. The rotor core 26 includes a laminated body 28 made of magnetic material (e.g., iron) and a plurality of permanent magnets 30 surrounding the body. A tubular shell 32 surrounds the magnets 30 and holds them in position. End caps 34, 36 are positioned on each end of the rotor core 26. Most aspects of the stator and rotor described above are conventional and will not be described in further detail.

A control board 38 positioned beside the stator 14 and rotor core 26 has circuitry for controlling operation of the motor 10. An optical sensor 40 is mounted on the board 38 for measuring the position and speed of the rotor as will be explained in greater detail below. Measurement of the position and speed of the rotor enables the control board 38 to optimally control operation of the motor 10.

Referring now to FIGS. 2 and 3, the end cap 34 includes a disk-shaped base 42, a plurality of blades 44 and posts 46 extending from the base 42, and one or more shutters 48 extending partially around the base 42.

The base 42 of the end cap 34 is a disk having a substantially constant thickness and a circular opening 50 through its center. The base 42 has substantially flat inner and outer surfaces which face toward and away from the rotor core 26, respectively. The base 42 has a diameter approximately equal to that of the rotor core 26. Thus, the ends of the tubular shell 32 may be rolled or crimped inward as shown in FIG. 1 to hold the rotor core 26 together. The opening 50 is sized so that when the end cap is attached to the rotor, a press fit engagement results between the end cap 34 and the shaft 24 of rotor 16. Preferably, the press fit engagement is the primary fastener for attaching the end cap 34 to the rotor 16, and the shell 32 acts as a secondary fastener. The center of the opening 50 coincides with the central axis A of the rotor 16. Alternately, it is envisioned that the opening 50 may have a diameter larger than that of the shaft 24. In this alternative, glue is the primary fastener for attaching the end cap 34 to the rotor 16, and the shell 32 acts as a secondary fastener.

A cylindrical collar 56 surrounding the opening 50 provides greater surface area for connecting the end cap 34 to the shaft 24, enhancing strength and durability of the connection. The collar 56 is either of one-piece construction with the base 42 or is firmly attached to the base 42 of the end cap 34.

The blades 44 extend axially with respect to the rotor from the outer surface of the base 42 and radially outward from the collar 56. When rotated with the rotor 16, the blades 44 enhance circulation of air around the rotor 16, functioning collectively as an impeller. Although six equally-spaced flat blades 44 are depicted on FIGS. 2 and 3, other configurations are envisioned as being within the scope of the present invention. For instance, a different quantity of non-equally spaced non-flat blades may be used. The blades 44 are sized to fit within the space constraints of the casing 12.

The posts 46 extend axially with respect to the rotor 16 from the outer surface of the base 42. The posts 46 function as balancing means, permitting the alteration of weight distribution around the base 42 to balance the rotor 16. The posts 46 are constructed from a soft metal or a malleable material (e.g. aluminum or zinc) so as to be deformable. In the preferred embodiment, the posts 46 are equally spaced, being located midway between adjacent blades 44. Six cylindrical posts 46 are included in the embodiment depicted in FIGS. 2 and 3. It is noted that a different quantity of posts 46, or non-cylindrical posts 46 are nonetheless included within the scope of this invention.

The shutters 48 extend axially with respect to the rotor 16 from the outer surface of the base 42. Each shutter extends partially around an arc having its center coaxial with the central axis A. The circumferential length of each of the six shutters 48 is equal to a circumferential distance between adjacent shutters, such that each shutter fills one-twelfth of the total circumference of the arc. Although six equally-spaced shutters are included in the preferred embodiment, other configurations are envisioned as being within the scope of the present invention. For instance, a different quantity of non-equally spaced shutters may be used.

The shutters 48 are located circumferentially so as to be aligned with the magnetic orientation of the permanent magnets 30 of the rotor core 26. In the preferred embodiment, the end cap 34 is oriented on the rotor core 26 so that each arc segment containing a shutter is aligned with permanent magnets 30 of one polarity, while each arc segment without a shutter is aligned with permanent magnets 30 of the opposite polarity.

The shutters 48 function in concert with the optical sensor 40 to sense rotor rotational position and speed. The optical sensor 40 has a light emitting diode (not shown) and a light sensor (not shown) separated by a gap through which light passes when emitted by the diode and received by the sensor. The sensor 40 is positioned so that the shutters 48, as they rotate with the rotor 16, intermittently pass through the gap where they block the passage of light. The optical sensor 40 provides an electrical signal indicating whether light is being received by the light sensor. Thus, for the embodiment having six shutters 48, the sensor 40 generates six alternating light blocked and light received signals during every 360 degree rotation of the rotor 16.

The rotational position of the rotor 16 with respect to the stator 14 is indicated by whether or not light is received by the optical sensor 40. At times when light is received, no shutter is positioned in the gap of the optical sensor 40; and at times when no light is received, a shutter 48 is positioned in the gap of the optical sensor. Therefore, the angular position of the magnetic polarity of the rotor core 26 relative to the windings on the stator 14 is indicated by whether or not light is received by the optical sensor 40.

Rotational speed is derived from the frequency of changes in the electrical signal from optical sensor 40. As the rotor 16 turns, distinct signals indicating light reception are produced by the sensor 40. The number of signals is equal to the number of shutters. For instance, the sensor 40 produces six signals during each revolution if the rotor 16 has six shutters 48 as illustrated in the figures. The rotational speed of the rotor 16 may be obtained by dividing the instantaneous rate of signals received by the number of shutters.

Referring again to FIG. 1, first and second end caps 34, 36, respectively, are mounted on the rotor 16. The first end cap 34 is mounted on the rotor 16 so the blades, posts, and shutters extend toward the shaft output direction of motor 10, whereas the second end cap 36 is mounted on the rotor so its blades, posts, and shutters extend the opposite direction. It is noted that although two end caps are shown, the use of a single end cap within a dynamoelectric machine is within the scope of this invention.

The second end cap 36 varies in design from the first end cap 34. For instance, the second end cap 36 has no shutters because its location within motor 10 precludes any need to function together with the optical sensor 40. Also, the second end cap 36 has taller blades 44 (in axial extent) than those of the first end cap 34 since more space is available at its location.

Referring now to FIG. 4, an end elevation of a second embodiment of a rotor end cap 60 is depicted. The end cap 60 of the second embodiment contains no shutters. Like the second end cap 36, the end cap 60 of the second embodiment is intended for application where measurement of rotational position and speed is unneeded, and there is no purpose to function with an optical sensor. The end cap 60 of the second embodiment contains eight equally-spaced blades 44 and posts 46. It is noted that a greater quantity of posts 46 provides finer resolution of circumferential locations for adding or removing weight to balance the rotor. The posts 46 of the end cap 60 are located near the outer perimeter of the base 42, where they provide a longer moment arm from the central axis A. Smaller incremental weight changes may thereby cause an equal change in balance. The end cap 60 does not contain a collar around the opening 50 in the end cap. The opening 50 is sized for a loose fit with the shaft 24 when the shaft is engaged within the opening. The end cap 60 may be glued or otherwise fastened to the rotor 16. The glue, together with the shell 32, secures the end cap 60 of the second embodiment to the rotor.

Referring now to FIG. 5, an end elevation of a third embodiment of a rotor end cap 62 is depicted. This end cap 62 contains neither shutters nor posts, but is provided solely with blades 44 for enhanced air circulation. The end cap 62 of the third embodiment has an opening 50 sized for a loose fit with the shaft 24.

As will be understood by those of ordinary skill in the art, the rotor end cap 34 and the other embodiments are intended not only for electric motors but for other dynamoelectric machines such as electric generators.

To balance the weight distribution around the rotor 16, the circumferential position of a rotor imbalance is determined and weight is added to at least one post 46 opposite the position of imbalance or removed from at least one post adjacent the position of imbalance. The rotor is first tested on a balance machine to detect and locate areas of rotor imbalance. When an imbalance is detected, a weight such as a washer (not shown) may be placed on one of the posts 46 in the appropriate location. The washer should have an inner diameter slightly greater than a diameter of the post 46 on which it is placed. The end of the post 46 is subsequently deformed as by axially compression or flattening so it spreads laterally to a diameter greater than that of the washer, thereby securing the washer to the post 46. Other means of fastening the weight to the post are also envisioned as being within the scope of the present invention. For instance, the weight may be adhesively bonded to the post.

Alternately, weight may be removed from at least one post 46 to correct a rotor imbalance. The posts 46 are constructed of a soft metal or a malleable material so that it is easy to remove weight from the post by filing, clipping, or cutting from the end. In an alternate method, the weight may be removed from a blade 44 or shutter 48.

Thus, the rotor weight distribution may be balanced through either the addition or removal of weight from the posts 46.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A rotor end cap for use with a rotor of a dynamoelectric machine to induce cooling air circulation, facilitate rotor balancing and enable rotor rotational position and speed sensing, the end cap comprising:

a base for attachment to said rotor of the dynamoelectric machine so that the base turns with the rotor;

a plurality of blades extending from the base in axial and radial directions with respect to the rotor for moving air to enhance cooling air circulation within the machine as the rotor turns;

balancing means extending axially from the base for altering a weight distribution around the base to balance the rotor; and at least one shutter extending partially around the base for intermittently blocking passage of light as the rotor turns to enable rotational position and speed sensing of the rotor.

2. An end cap as set forth in claim 1 wherein said base has an opening extending therethrough for receiving the rotor therein to attach the end cap to the rotor.

3. An end cap as set forth in claim 2 wherein said opening is sized and shaped to have a press fit with the rotor when the rotor is received within the opening.

4. An end cap as set forth in claim 2 further comprising a collar surrounding the opening.

5. An end cap as set forth in claim 4 wherein each of said plurality of blades extends from the collar.

6. An end cap as set forth in claim 1 wherein each of said plurality of blades is substantially flat.

7. An end cap as set forth in claim 6 wherein each of said plurality of blades extends directly radially outward with respect to the rotor when the base is attached to the rotor.

8. An end cap as set forth in claim 1 wherein said balancing means includes a plurality of posts spaced around the base.

9. An end cap as set forth in claim 8 wherein said balancing means further comprises a weight adapted for attachment to at least one of said plurality of posts for altering the weight distribution around the base.

10. An end cap as set forth in claim 9 wherein said posts are deformable for retaining said weight on said at least one post when attached thereto.

11. An end cap as set forth in claim 8 wherein each of said posts extends axially with respect to the rotor when the base is attached to the rotor.

12. An end cap as set forth in claim 8 comprising an equal number of posts and blades, wherein said posts and blades are alternately positioned around the base.

13. An end cap as set forth in claim 1 comprising a plurality of shutters equally spaced around the base.

14. An end cap as set forth in claim 13 wherein each of said shutters has a circumferential length equal to a circumferential distance between adjacent shutters.

15. An end cap as set forth in claim 13 comprising an equal number of shutters and blades, wherein each of said plurality of shutters is positioned radially outward from one of said plurality of blades.

16. An end cap as set forth in claim 1 wherein the base, blades, balancing means, and shutter are constructed as a single-piece unit.

17. A dynamoelectric machine comprising:

a casing having a hollow interior;

a stationary assembly within the hollow interior of the casing;

a rotor rotatably received within the hollow interior of the casing for rotation about an axis of rotation; and an end cap comprising:

(a) a base for attachment to said rotor of the dynamoelectric machine so that the base turns with the rotor about the axis of rotation, (b) a plurality of blades extending from the base in axial and radial directions with respect to the rotor for moving air to enhance cooling air circulation within the machine as the rotor turns, (c) balancing means extending from the base for altering a weight distribution around the base to balance the rotor, and (d) at least one shutter extending partially around the base for intermittently blocking passage of light as the rotor turns to enable rotational position and speed sensing of the rotor.

18. A rotor end cap for use with a rotor of a dynamoelectric machine to enable rotational position and speed sensing, the end cap comprising:

a base for attachment to said rotor of the dynamoelectric machine so that the base turns with the rotor; and at least one shutter extending partially around the base for intermittently blocking passage of light as the rotor turns to enable rotational position and speed sensing of the rotor.

* * * * *